No. 749,165. PATENTED JAN. 12, 1904.
WILSON W. BURSON & WILLIAM W. BURSON.
MOTOR VEHICLE.
APPLICATION FILED MAR. 2, 1903.
NO MODEL. 2 SHEETS—SHEET 1.
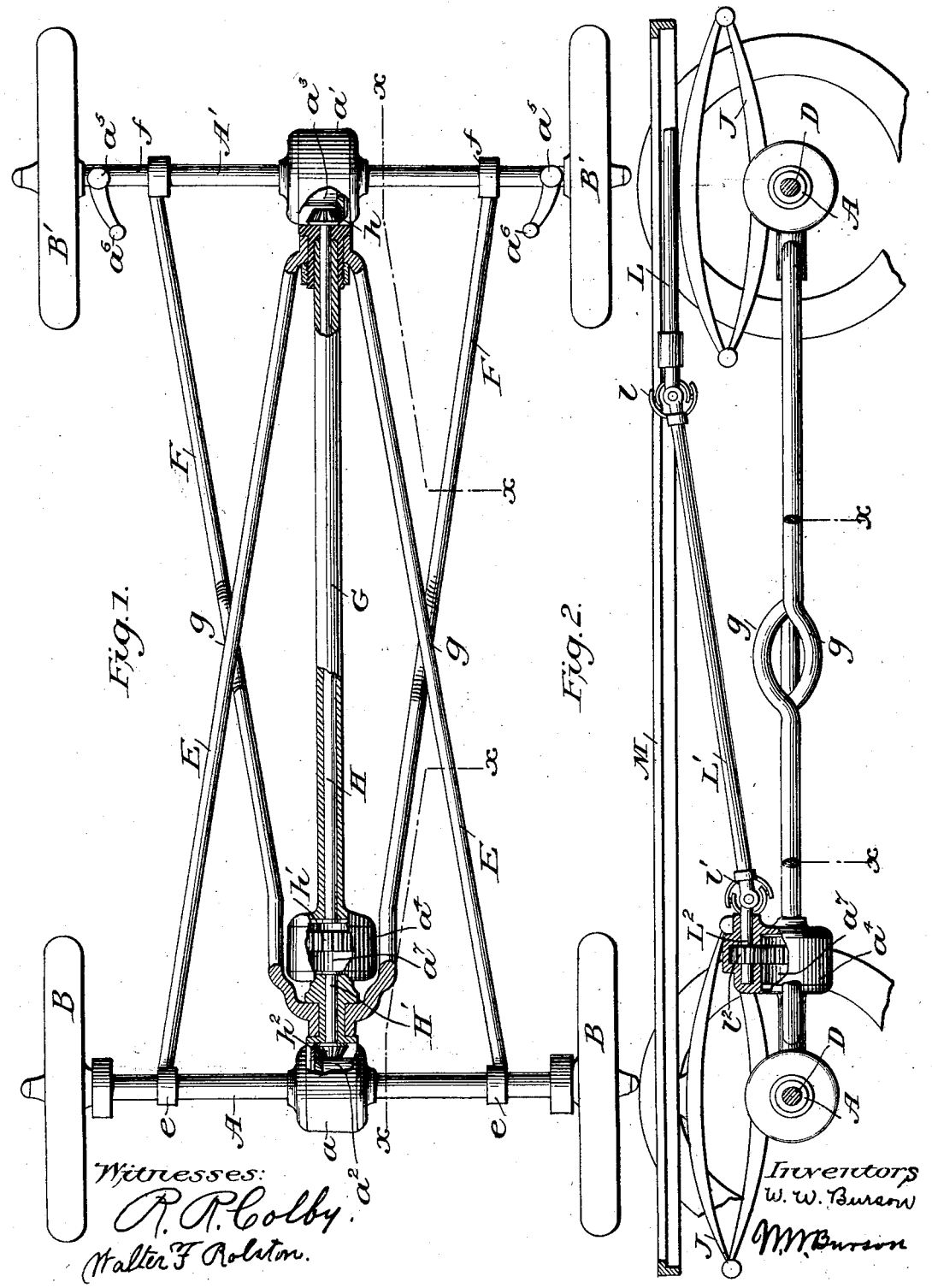

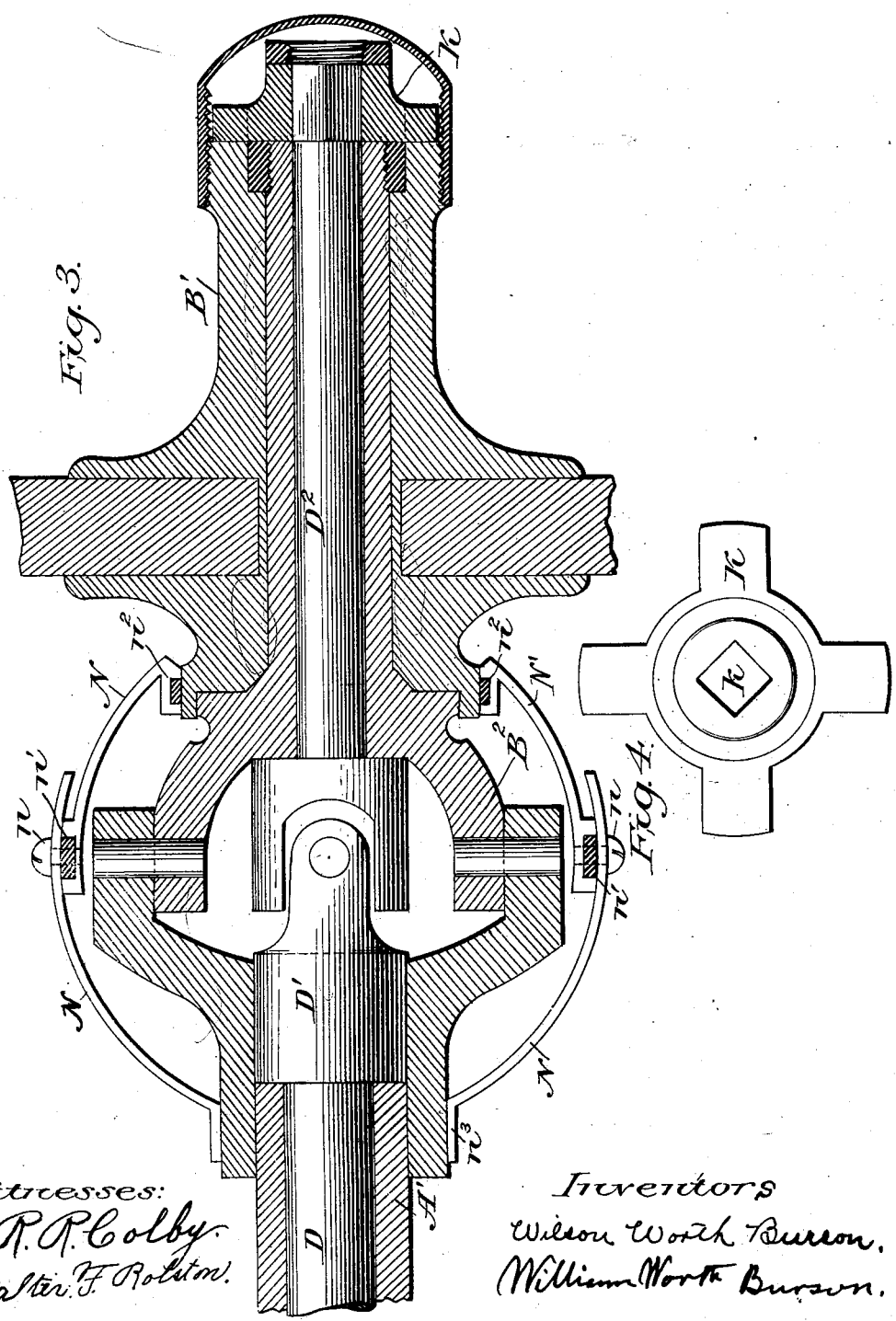

No. 749,165.	Patented January 12, 1904.

UNITED STATES PATENT OFFICE.

WILSON WORTH BURSON, OF ROCKFORD, AND WILLIAM WORTH BURSON, OF CHICAGO, ILLINOIS.

MOTOR-VEHICLE.

SPECIFICATION forming part of Letters Patent No. 749,165, dated January 12, 1904.

Application filed March 2, 1903. Serial No. 145,735. (No model.)

*To all whom it may concern:*

Be it known that we, WILSON WORTH BURSON, residing at Rockford, in the county of Winnebago, and WILLIAM WORTH BURSON, residing at Chicago, in the county of Cook, in the State of Illinois, citizens of the United States, have invented certain new and useful Improvements in Motor-Vehicles, of which the following is a specification.

Our invention relates to motor-vehicles of the four-wheel-driven type; and the objects of our invention are, first, to provide means for driving each of the four ground-wheels with equal power; second, to provide means for driving the wheels through a vertically-jointed axle; third, to provide hollow axles for the ground-wheels which may be given any desired "pitch" and are provided with an inclosed driving-shaft connecting with outer end of the hub and an actuating part; fourth, to provide a hollow axle to sustain the load and a driving-shaft in said axle connecting the hub with an actuating part; fifth, to provide an axle-connecting frame permitting free vertical movement of the ground-wheels; sixth, to provide means for holding axles in alinement by braces rigidly attached to the axles near the wheels and swiveled longitudinally near the middle of the opposite axle; seventh, to provide dust-proof coverings for the gears and other working parts. We attain these objects by the mechanism illustrated in the accompanying drawings, in which—

Figure 1 is a top view of the mechanism, certain parts being removed and other parts shown in section. Fig. 2 is a vertical section on the line $x\ x$ of Fig. 1, the removed parts of said Fig. 1 being shown. Fig. 3 is a vertical section, enlarged, of the jointed axle and wheel-driving mechanism. Fig. 4 is a detail showing the connection between the driving-shaft and hub.

Similar letters refer to the same part throughout the several views.

The rear axle A and front axle A' are preferably tubular and are rigidly secured to the cylindrical differential-gear covers $a\ a'$.

The rear ground-wheels B B turn freely on the tubular axle A, and the front ground-wheels B' B' in like manner turn freely upon the vertically-jointed ends of axle A', Figs. 1 and 3. Inside the tubular axle A is a driving-shaft D, one end of which shaft is fastened to its adjacent differential gear $a^2$, placed in the case $a$, and the other end fits in the hole $k$ in the drive-block K, Fig. 4. The arms of the drive-block K are properly recessed in the outer end of the hub of the wheel B, which turns the wheel by the rotation of the differential.

The front wheels B' B' are driven in the same manner as described for the rear wheels, except that the axle A' is jointed vertically at $a^5$ and the driving-shaft D is joined with a universal coupling D' to the wheel portion $D^2$, which turns the wheel B' through the driving-block K, as described for the rear wheels.

The axles A A' are held in parallel alinement by the braces E E, attached rigidly to axle A near the wheel end at $e\ e$, and the other ends are united and swiveled longitudinally to an extension of the gear-cover $a'$, and the braces F F are attached to the axle A' at $f\ f$, and the other ends are united and swiveled longitudinally to an extension of the gear-cover $a$. These braces are so bent at their crossing $g\ g$ as to permit of a free vertical movement of each separate ground-wheel.

The tube G swivels in a bearing in the extension of $a'$ on axle A' and is rigidly joined to case $a^4$—an extension of case $a$ on axle A. Within tube G is shaft H, on the front end of which is fastened bevel-pinion $h$, which meshes in a bevel-gear driving differential $a^3$, and the rear end of said shaft is fastened to differential $a^7$, contained in case $a^4$. Abutting with shaft H is shaft H', the front end of which is fastened to differential $a^7$, and on the rear end is fastened the bevel-pinion $h^2$, which meshes in a bevel-gear driving the differential $a^2$, contained in the case $a$.

Since the combination known as "differential" gears described as contained in case $a\ a'$ on each axle and of differential gear $a^7$, contained in case $a^4$ on tube G, are well-known devices, it is not thought necessary to illustrate or describe their construction.

Direction is given to the vehicle by means of the arms $a^6$, attached to the jointed axle $B^2$, on which the front wheels turn; but the means for operating them are not shown.

Upon the springs J J J J, Fig. 2, which may be of any desired form, supported upon the axles, is secured the platform M, which may be fastened to each spring J, thus giving a four-point support, or a bar may connect the front springs and one end of platform attached pivotally to the center of the bar, thus giving a three-point support to the platform.

The motor of any desired form is placed so as readily to connect with shaft L, which is coupled by the universal coupling $l$ to shaft L', which is connected through the universal coupling $l'$ to shaft $L^2$, held in its bearing on case $a^4$, on which shaft is the spur-pinion $l^2$, which meshes with the spur-gear $h'$, which drives differential $a^7$, contained in case $a^4$.

Attention is invited to the operation of the three differentials $a^2$ on the rear axle, $a^3$ on the front axle, and $a^7$ on the tube G, connecting the driving-shafts H H'. The axle differentials, as is well understood, permit the wheels on each axle to move at different speeds, while differential $a^7$ provides that differentials $a^2$ and $a^3$ may move at different speeds, so that each wheel shall receive equal power through its varied movements.

The hollow axles upon which the ground-wheels turn freely permit of being bent so as to give any pitch or inclination desired to the wheels. This pitch is universal in horse-drawn vehicles, but unusual in motor-vehicles on account of the difficulties of such construction.

It is desirable to protect the jointed connections of axle A' and the coupling D', as also the wheel-bearing, from dust. For this purpose the spherical cover N is fastened to the axle at $n^3$ and pivoted at $n$ to the coacting cover part N', which fits the inner end of the wheel-hub. The contact of the parts N N' is rendered dust-proof by the packing $n'$ and the contact of the wheel-hub by packing $n^2$. It will be seen that this cover protects the parts from dust, while admitting full movement of the jointed parts.

It has been our purpose in this specification to show and describe only the novel features, omitting descriptions of well-known parts used in the construction of our vehicle.

Various changes can be made in the aforedescribed mechanism without departing from the scope of our invention.

What we claim is—

1. In a motor-vehicle, the combination of two brace-pieces attached to the rear axle near the ground-wheels and extending forward are united and swiveled to a part of a differential-gear case extending backward from the front axle, two brace-pieces attached to the front axles near the jointed union and extending backward are united and swiveled to a part of a differential-gear case extending forward from the rear axle, said braces being bent at their crossing so as to permit a free vertical movement of the ground-wheels, whereby the axles are held in true alinement, and the ground-wheels allowed free vertical movement, substantially as specified.

2. In a motor-vehicle, the combination of two brace-pieces attached to the rear axle and united and swiveled near the middle of the front axle, two brace-pieces attached to the front axle and united and swiveled near the middle of the rear axle, and a tubular connecting-piece extending from the front to the rear axle, whereby the axles shall be held in alinement and the ground-wheels given free vertical movement, substantially as described.

3. In a motor-vehicle, the combination of an inclosed, divided driving-shaft adapted to drive each rear wheel by means of a differential gear, an inclosed, divided driving-shaft adapted to drive each forward wheel by means of a differential gear, an inclosed driving-shaft extending from the rear differential gear to the front differential gear, and means for operating said central driving-shaft, whereby the four ground-wheels may be driven and the driving parts protected from dust, substantially as set forth.

4. In a motor-vehicle, the combination of two tubular axles supporting the ground-wheels, each axle bisected and joined to a differential-gear case, a differential gear in each case, a tubular connection extending from one differential case to its coacting differential case, a driving-shaft within said tubular connection which engages the differential gears, and means for driving said shaft whereby the operating parts may be protected from dust, substantially as specified.

5. In a motor-vehicle, the combination of two inclosed, divided axles each provided with a differential gear adapted to drive the ground-wheels, an inclosed driving-shaft bisected, the two outer ends engaging, by means of proper gears the two differential gears of the axles and the inner ends engaging an interposed differential gear, and means for operating said interposed differential gear, whereby equal power is applied to the ground-wheels of each axle, and all the gears protected from dust, substantially as set forth.

6. In a motor-vehicle, the combination of two axles, each provided with a differential case, with differential gears therein, a tubular connection swiveled to one of said cases and connected to the other case, a differential case formed in said tubular part, a driving-shaft with suitable gearing engaging the axle-differentials through the interposed differential gears placed in the tubular connection, a driving-shaft engaging the interposed differential, whereby the ground-wheels may be driven with equal power, and be protected from dust substantially as set forth.

7. In a motor-vehicle, the combination of a hollow, vertically-jointed axle, an inclosed driving-shaft provided with a universal coupling in line with the axle-joint, a spherical cover in two parts extending from the wheel-hub to the axle, overlapping in line with the jointed axle and a packing-piece between the overlapping parts of the cover, adapted to permit the full movement of the jointed axle and to protect the parts from dust, substantially as described.

8. In a motor-vehicle, the combination of a jointed axle, a jointed driving-shaft within said axle, a spherical cover for said jointed axle extending from the hub to the main axle, said cover formed of two overlapping parts pivoted in line with the jointed axle, a packing-strip between the cover and the hub, and another between the overlapping joints of the cover, whereby the dust shall be excluded from the jointed parts and the wheel-axle, substantially as set forth.

In testimony whereof we have signed our names to this specification in the presence of two subscribing witnesses.

WILSON WORTH BURSON.
WILLIAM WORTH BURSON.

Witnesses:
BURTON W. NORTON,
NELLIE BUNKER.